United States Patent
Mi et al.

(10) Patent No.: US 12,135,164 B2
(45) Date of Patent: Nov. 5, 2024

(54) INDICATION DEVICE FOR A REFRIGERATOR AND REFRIGERATOR

(71) Applicant: BSH Hausgeräte GmbH, Munich (DE)

(72) Inventors: Dawei Mi, Nanjing (CN); Rong Zeng, Nanjing (CN); Chenli Hu, Nanjing (CN)

(73) Assignee: BSH Hausgeräte GmbH, Munich (DE)

(*) Notice: Subject to any disclaimer, the term of this patent is extended or adjusted under 35 U.S.C. 154(b) by 43 days.

(21) Appl. No.: 17/988,942

(22) Filed: Nov. 17, 2022

(65) Prior Publication Data
US 2023/0152034 A1  May 18, 2023

(30) Foreign Application Priority Data

Nov. 17, 2021 (CN) .......................... 202122812192.4

(51) Int. Cl.
*F25D 27/00* (2006.01)
*F25D 25/02* (2006.01)

(52) U.S. Cl.
CPC ......... *F25D 27/005* (2013.01); *F25D 25/025* (2013.01); *F25D 2327/001* (2013.01); *F25D 2400/36* (2013.01)

(58) Field of Classification Search
CPC .................. F25D 27/005; F25D 25/025; F25D 2327/001; F25D 2400/36; F25D 29/00;
(Continued)

(56) References Cited

U.S. PATENT DOCUMENTS

| | | | | |
|---|---|---|---|---|
| 4,851,662 A | * | 7/1989 | Ott ....................... | H03K 17/941 250/214 AL |
| 2010/0320890 A1 | * | 12/2010 | Jung ....................... | F25D 27/00 312/405 |

(Continued)

FOREIGN PATENT DOCUMENTS

| WO | WO-2009104863 A2 * | 8/2009 | ........... E05B 1/0015 |
|---|---|---|---|
| WO | WO-2020156930 A1 * | 8/2020 | ........... E05B 1/0015 |

OTHER PUBLICATIONS

WO 2020156930, Aug. 6, 2020, Peter Jell et al, English Translation (Year: 2020).*

*Primary Examiner* — Peggy A Neils
(74) *Attorney, Agent, or Firm* — Laurence A. Greenberg; Werner H. Stemer; Ralph E. Locher (57) ABSTRACT

An indication device for a refrigerator includes an indicator light or a plurality of indicator lights indicating synchronously, a first detection unit configured to detect an object activity situation around the refrigerator, a second detection unit configured to detect an open/closed state of at least one door body of the refrigerator, and a processor. The processor is communicatively connected to the first detection unit, the second detection unit, and the indicator light to be adapted to control the indicator light to indicate a first state or a second state, according to detection results of the first detection unit and the second detection unit. The first state is different than the second state. A corresponding refrigerator includes a number of indicative elements and related indication states on a surface of a refrigerator panel which are simplified, but ensure sufficient coverage of various sensing functions and improve user satisfaction.

15 Claims, 9 Drawing Sheets

(58) Field of Classification Search
CPC .. F25D 2700/02; G01S 13/88; F21V 23/0442; F21V 33/0024
See application file for complete search history.

(56) References Cited

U.S. PATENT DOCUMENTS

| | | | |
|---|---|---|---|
| 2014/0111118 A1* | 4/2014 | Kendall | F25D 23/028 315/362 |
| 2015/0035432 A1* | 2/2015 | Kendall | F25D 27/005 315/76 |

* cited by examiner

INDICATION DEVICE FOR A REFRIGERATOR AND REFRIGERATOR

CROSS-REFERENCE TO RELATED APPLICATION

This application claims the priority, under 35 U.S.C. § 119, of Chinese Patent Application CN 202122812192.4, filed Nov. 17, 2021; the prior application is herewith incorporated by reference in its entirety.

FIELD AND BACKGROUND OF THE INVENTION

The invention relates to the field of household appliances, and in particular, to an indication device for a refrigerator and a corresponding refrigerator.

With the advancement of the intelligent technology, demands of users for refrigerators are no longer just the size of a storage space. Nowadays, people pay more attention to visual feeling of science and technology and use experience of refrigerators.

At present, a light source mounted in a refrigerator body is mainly used in the market to provide indicative illumination. When a user opens a door to take an item, an illumination lamp located in a storage chamber is turned on, and when the refrigerator door is closed, the illumination lamp is turned off. However, when the refrigerator door is not fully closed, the illumination light emitted from the storage chamber is generally weak and is not easily perceived from the outside, and therefore it is difficult for the user to confirm whether the refrigerator door is closed or not. In addition, when the user takes an item in a dark environment, due to the lack of corresponding illumination outside the refrigerator, it also brings inconvenience to daily operation of the user.

Under this background, it is proposed in the related art to respectively indicate the proximity of a human body and an open/closed state of the door through indicator lights of different colors or types. However, there are too many indicative elements on the front side of the refrigerator, which affects the overall appearance of the refrigerator; moreover, overlapping bright and dark states of multiple light sources also have higher requirements for the memory and operation familiarity of the user. Particularly, when the user completes a series of combined operations of approaching the refrigerator, opening and closing the door, and leaving the refrigerator, frequent bright and dark alternate display of lights of multiple colors easily confuse the user.

SUMMARY OF THE INVENTION

It is accordingly an object of the invention to provide an improved indication device for a refrigerator and a corresponding refrigerator, which overcome the hereinafore-mentioned disadvantages and solve at least some of the problems of the heretofore-known devices and refrigerators of this general type.

With the foregoing and other objects in view there is provided, in accordance with a first aspect of the invention, an indication device for a refrigerator, the indication device comprising:

an indicator light or a plurality of indicator lights indicating synchronously; a first detection unit configured to detect an object activity situation around the refrigerator;

a second detection unit configured to detect an open/closed state of at least one door body of the refrigerator; and a processor, the processor being communicatively connected to the first detection unit, the second detection unit, and the indicator light to be adapted to, according to detection results of the first detection unit and the second detection unit, control the indicator light to indicate in a first state or a second state, and the first state being different from the second state.

The invention mainly includes the following technical concept: it is proposed to comprehensively determine a final indication state of an indicator light through two detection signals, so as to avoid simultaneous appearance of different bright and dark effects of multiple light sources from confusing people. While the number of indicative elements and related indication states are simplified, user satisfaction is improved.

According to an optional embodiment of the invention, in a case that the first detection unit detects that an object enters a determination range around the refrigerator and the second detection unit detects that all door bodies of the refrigerator are closed, the indicator light indicates in the first state, and in a case that the second detection unit detects that the at least one door body of the refrigerator is open, the indicator light indicates in the second state. Therefore, it is fully ensured that two key states "a human body approaches the refrigerator and the refrigerator door is not closed" can be visually and reliably distinguished through one indicator light. In addition, even if the human body approaches the refrigerator in a case that the refrigerator door is open, the indicator light would not be switched from the second state back to the first state, which helps to continuously indicate, to the outside, that the refrigerator door is not yet closed, so that the user can perceive the information and perform related processing in a timely fashion.

According to an optional embodiment of the invention, in a case that the second detection unit detects that the at least one door body of the refrigerator is changed from an opened state to a closed state until all the door bodies are closed, the indicator light indicates in the first state. In this way, the switching of the indication states advantageously conveys, to the user, information "the refrigerator is changed from an opened state to a closed state", so as to interact with the user.

According to an optional embodiment of the invention, the indicator light is always ON in the first state and the indicator light dynamically indicates in the second state, or the indicator light dynamically indicates in the first state and the indicator light is always ON in the second state. Here, the circular breathing effect is simulated through the dynamic indication state, so as to show a natural sense of life, so that visual fatigue and discomfort of directly illuminating eyes brought to the user are reduced when the user observes the indicator light.

According to an optional embodiment of the invention, the processor includes a timer and a delay trigger circuit, the timer is configured to be adapted to record a first duration when the indicator light indicates in the first state and/or a second duration when the indicator light indicates in the second state, the delay trigger circuit is configured to, according to the first duration and/or the second duration, control the indicator light to indicate in a third state, and the third state is different from the first state and the second state. Therefore, automatic state restoration of the indicator light is realized by monitoring the duration. On one hand, it is ensured that the indication effect is fully sensed by the user, and on the other hand, energy consumption is also saved to some extent.

According to an optional embodiment of the invention, the indication device further includes a switch for controlling disabling and enabling of the first detection unit. In this way, the user can flexibly select disabling and enabling of a proximity function according to requirements, so as to provide the user with the possibility of saving energy consumption.

According to an optional embodiment of the invention, the first detection unit is configured as a radar sensor, and the radar sensor has a fan-shaped detection range with a radiation radius of 2 m to 3 m. Due to the radiation principle characteristics of the radar sensor, the detection range of a large angle is provided, and the proximity detection sensitivity of the human body is improved.

According to an optional embodiment of the invention, the second detection unit includes a magneto-sensitive sensor. Thus, the proximity detection of the door body and the refrigerator body is realized in a simple manner.

With the objects of the invention in view, there is also provided, according to a second aspect of the invention, a refrigerator, comprising a refrigerator body, a door body, and the indication device according to the foregoing embodiment, the indication device being disposed on the refrigerator body and/or the door body.

According to an optional embodiment of the invention, an external decorative surface of an indicator light of the indication device is disposed obliquely outward relative to the refrigerator body of the refrigerator. This arrangement caters to the line of sight of an operator, and the indicator light can be visually observed more easily.

According to an optional embodiment of the invention, the door body has a handle groove structure at an edge of an opening and closing side, and at least one indicator light of the indication device is disposed in the handle groove structure of the door body and extends along a length direction of the handle groove structure. Therefore, basic illumination of an operation area near the handle of the refrigerator door is realized, which is convenient for a user to confirm a position of the handle when approaching in a dark environment.

According to an optional embodiment of the invention, the at least one indicator light includes an LED lamp body and at least a partially light-transmissive lamp cover, the LED lamp body is embedded in the handle groove structure of the door body, and the lamp cover covers the LED lamp body. Through the use of the embedded arrangement of the lamp body in the handle groove structure and through the sealing of the lamp cover, the overall appearance of the refrigerator is not affected.

According to an optional embodiment of the invention, the handle groove structure includes a first side wall, a second side wall opposite to the first side wall, and a transition portion connecting the first side wall and the second side wall, the first side wall is provided with an accommodating portion on a surface opposite to the second side wall, and the accommodating portion is configured to be adapted to fit the LED lamp body to allow the LED lamp body to be embedded in the first side wall of the handle groove structure. Through the use of the concealed design of the LED lamp body on the inner wall of the handle groove, the indicator light does not protrude from a refrigerator panel, thereby achieving a simple and beautiful overall appearance.

According to an optional embodiment of the invention, an indicative identifier is hollowed, for example indented or cut-out, on a position of the lamp cover covering the LED lamp body. Thus, the indicator light has a content transfer value in addition to the basic indicative function.

According to an optional embodiment of the invention, the indicative identifier includes text and/or a pattern representing a function of at least one operation partition of the refrigerator. Therefore, a special working state of the refrigerator can be reflected, and a main function of an operation partition where the indicator light is located can also be described, thereby realizing maximization of information acquisition in a simple manner.

Other features which are considered as characteristic for the invention are set forth in the appended claims.

Although the invention is illustrated and described herein as embodied in an indication device for a refrigerator and a refrigerator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 9 is a partial enlarged view of the drawer-type door body shown in FIG. 5 when an indicator light is always ON.

DETAILED DESCRIPTION OF THE INVENTION

In order to make the technical problems, technical solutions, and beneficial technical effects to be solved by the invention clearer, the invention will be further described in detail below with reference to the accompanying drawings and a plurality of exemplary embodiments. It is to be understood that the specific embodiments described herein are only used to explain the invention, and are not intended to limit the scope of protection of the invention.

It is to be understood that, in this description, the expressions "first," "second," "third" and the like are used for descriptive purposes only, and cannot be understood as indicating or implying relative importance, and cannot be understood as implicitly indicating the number of indicated technical features, either.

Figure 1:
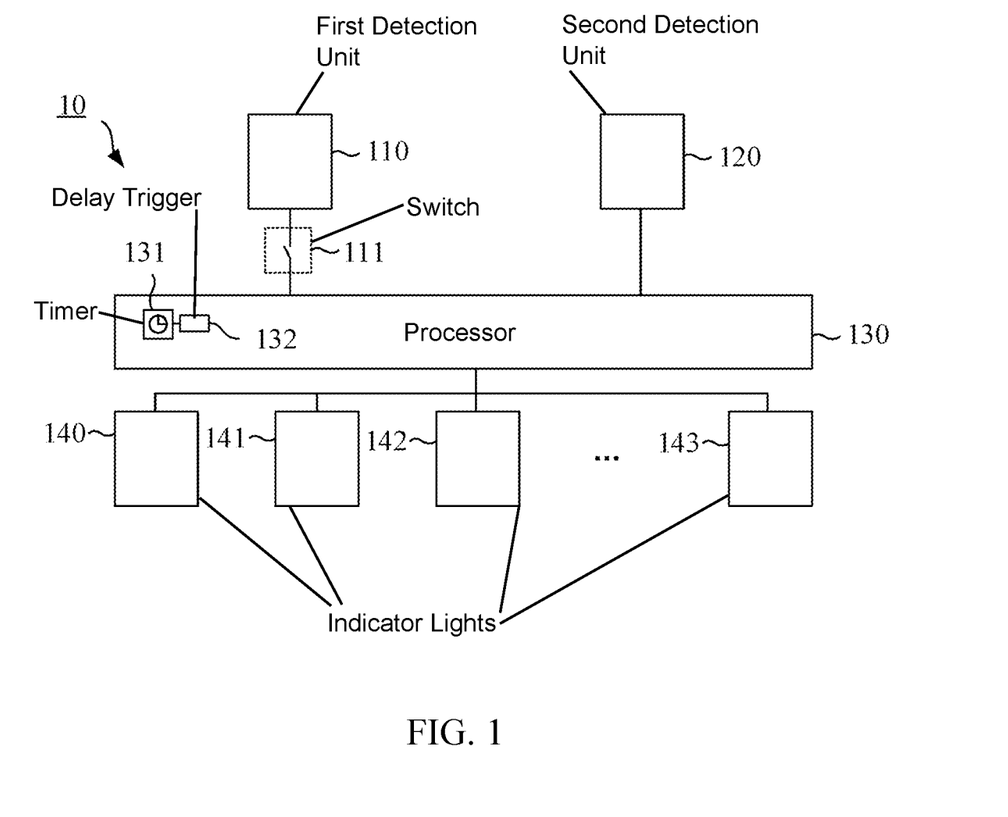
FIG. 1 is a structural block diagram of an indication device according to an exemplary embodiment of the invention.

Referring now to the figures of the drawings in detail and first, particularly, to FIG. 1 thereof, there is seen a structural block diagram of an indication device 10 according to an exemplary embodiment of the invention. It can be seen from FIG. 1 that the indication device 10 includes a first detection unit 110, a second detection unit 120, a processor 130, and a plurality of indicator lights 140, 141, 142, and 143 operating synchronously. In the sense of the invention, "synchronous operation" means that the plurality of indicator lights 140, 141, 142, and 143 have a same indication state at any time, and are switched from one state to the other state synchronously. It is also to be understood that although the indication device 10 is shown in this example as including the plurality of indicator lights 140, 141, 142, and 143, the indication device 10 may also only include one indicator light 140.

The first detection unit 110 is configured to, for example, detect an object activity situation around a refrigerator. Here, the object activity situation around the refrigerator especially includes: an object enters a determination range around the refrigerator, and the object leaves the determination range around the refrigerator. As an example, the first detection unit 110 may be configured as a radar sensor, and the radar sensor has a fan-shaped detection range with a radiation radius of 2 m to 3 m.

The second detection unit 120 is configured to, for example, detect an open/closed state of at least one door body of the refrigerator. As an example, the second detection unit 120 may be configured as a magneto-sensitive sensor, and provides a detection result in the form of an electrical signal only when all the door bodies are detected to be closed.

As shown in FIG. 1, the processor 130 is connected to the first detection unit 110, the second detection unit 120, and the indicator lights 140, 141, 142 and 143, respectively, so as to control, according to detection results of the first detection unit 110 and the second detection unit 120, the indicator lights 140, 141, 142, and 143 to synchronously indicate in a first state or a second state. The first state is different from the second state. As an example, the indicator lights 140, 141, 142, and 143 are all, for example, always ON in the first state, the indicator lights 140, 141, 142, and 143 dynamically indicate in the second state (e.g., a gradient bright-dark alternate change), and vice versa. Here, the breathing frequency and the luminous intensity of the indicator lights 140, 141, 142, and 143 in the dynamically indicated state are consistent, and the luminous intensity "during breathing" may be lower than, for example, the luminous intensity in the "always-ON" state.

In the embodiment shown in FIG. 1, the processor 130 may further include, for example, a timer 131 and a delay trigger circuit 132 connected to each other. The timer 131 is configured to record a first duration when the indicator lights 140, 141, 142, and 143 indicate in the first state and/or a second duration when the indicator lights 140, 141, 142, and 143 indicate in the second state. The delay trigger circuit 132 is configured to, for example, compare the first duration or the second duration with a predefined time threshold, and control, according to a comparison result, the indicator lights 140, 141, 142, 143 to be switched to a third state. Here, in the third state, the indicator lights 140, 141, 142, and 143 are all turned off, for example. As another example, the timer 131 is further configured to, for example, record a third time period related to a detection result of the first detection unit 110 and/or a fourth time period related to a detection result of the second detection unit 120. In this example, the delay trigger circuit 132 is further configured to, for example, delay triggering the control of the indicator lights 140, 141, 142, 143 according to the third time period and/or the fourth time period. Therefore, a duration of each operation action of a user can be taken into account, so that misoperation or false triggering is advantageously eliminated, and moreover, energy waste caused by frequent triggering is also avoided. For example, the timer 131 records the third time period from a time of entering a determination range around the refrigerator by the user to a time of leaving the determination range and sends the third time period to the delay trigger circuit 132. The delay trigger circuit 132 determines, according to a corresponding comparison mechanism, that the third time period is less than a predefined third time threshold, which indicates that the user is likely to simply pass by the refrigerator without the intention of using the refrigerator. In this case, the delay trigger circuit 132 does not immediately trigger the indicator lights 140, 141, 142, and 143 to indicate in the first state, but delays the trigger of the first state of the indicator lights 140, 141, 142, 143 a time period.

In addition, the indication device 10, for example, further includes a switch 111 for controlling enabling and disabling of the first detection unit 110, so that the indicator lights 140, 141, 142, and 143 can be temporarily not turned on due to the proximity of a human body according to user requirements, thereby saving energy consumption.

Figure 2:
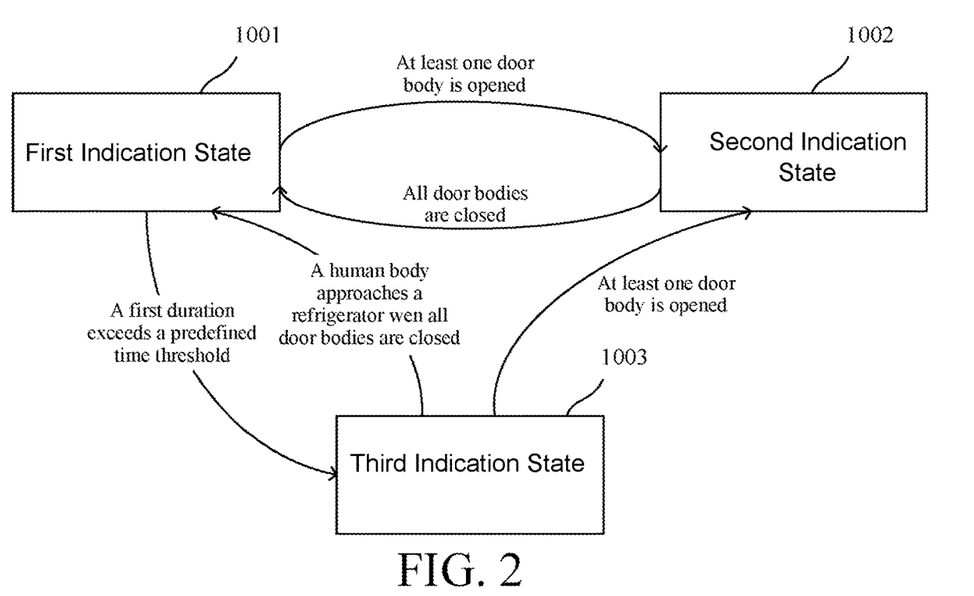
FIG. 2 is a schematic diagram of an operation principle of an indication device according to an exemplary embodiment of the invention.

FIG. 2 is a schematic diagram of an operation principle of an indication device according to an exemplary embodiment of the invention.

Here, three indication states 1001, 1002, and 1003 and related switching operations of the indicator lights 140, 141, 142, and 143 of the indication device 10 in FIG. 1 are exemplarily shown. It can be seen that, in a case that the first detection unit 110 detects that an object enters a determination range around the refrigerator and the second detection unit 120 detects that all door bodies of the refrigerator are closed, the indicator lights 140, 141, 142, and 143 indicate, for example, in the first state (e.g., always-ON). Here, in a case that the timer 131 of the processor 130 records that the first duration of the first state 1001 exceeds a predefined time threshold (e.g., 30 seconds), the delay trigger circuit 132 controls the indicator lights 140, 141, 142, and 143 to be switched from the first state 1001 to the third state 1003 (e.g., turn-off). In a case that the second detection unit 120 detects that the at least one door body of the refrigerator is open, whether the indicator lights 140, 141, 142, and 143 are in the first state 1001 or the third state 1003, the indicator lights 140, 141, 142, and 143 are all switched to the second state 1002 (here, for example, a breathing-type bright-dark alternate change). In addition, in a case that the second detection unit 120 detects that the refrigerator is changed from a state in which the at least one door body is open to a state in which all door bodies are closed, the indicator lights 140, 141, 142, and 143 are switched from the second state 1002 back to the first state 1001.

Herein, although it is shown in conjunction with this example that the indicator lights 140, 141, 142, and 143 are always ON in the first state 1001 and dynamically indicate in the second state 1002, the indicator lights 140, 141, 142, and 143 may also dynamically indicate in the first state 1001 and be always ON in the second state 1002.

FIG. 3a to FIG. 3d are schematic diagrams of different indication states of an indicator light in one exemplary operation scenario. Exemplarily, one indicator light 140 of the indication device 10 in FIG. 1 is exemplarily mounted on one of the door bodies 20 of the refrigerator. Here, FIG. 3a to FIG. 3d respectively show the indication state change of the indicator light 140 caused by the operation of the user and the opening and closing of the refrigerator door.

Figure 3A:
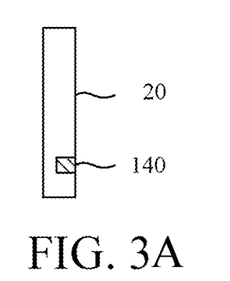
FIGS. 3A to FIG. 3D are schematic diagrams of different indication states of an indicator light in one exemplary operation scenario.

FIG. 3a shows a default turn-off state of the indicator light 140. This default turn-off state is defined, for example, as a third state. For example, in a case that no user activity is detected around the refrigerator and the refrigerator doors are all closed, the indicator light 140 presents such an indication state.

Figure 3B:
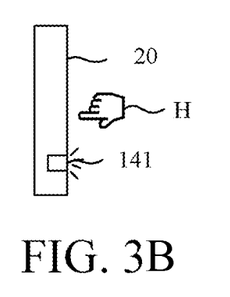

Next, in FIG. 3b, a user H, for example, approaches the refrigerator and desires to take an item from the refrigerator. In a case that the user H enters a determination range around the refrigerator, all the door bodies of the refrigerator are all in a closed state. Therefore, the first detection unit and the second detection unit respectively provide corresponding detection signals to the processor (not specifically shown), and the processor causes the first state "always-ON" of the indicator light 140 to be valid. As shown in FIG. 3b, the indicator light 140 is changed from a turn-off state to an always-ON state.

Figure 3C:
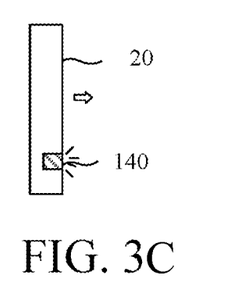

Subsequently, in FIG. 3c, the user operates the door body 20 of the refrigerator and opens same. In this case, the second detection unit, which is not shown, identifies the state change of the door body 20, and then provides, to the processor, a detection signal indicating that the door body is open, so that the processor causes the indicator light 140 to "dynamically indicate" in the second state. Here, the indicator light 140 presents, for example, a gradient bright-dark alternate change, to yield a breathing effect. As an example, the brightness of the indicator light 140 when turned on is, for example, lower than the brightness in the first state.

Figure 3D:
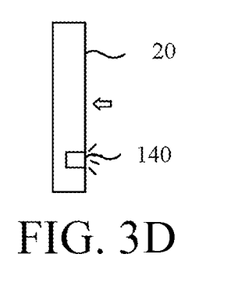

In FIG. 3d, the user closes the door body 20 of the refrigerator after use. The second detection unit detects that the operation of the user causes the refrigerator door bodies to be changed from an opened state to a closed state, and thus, the second detection unit sends the signal to the processor. The processor restores the indicator light 140 to the first state "always-ON" as shown in FIG. 3d. However, such an always-ON state lasts, for example, only for a predefined time period (e.g., 30 seconds). After the predefined time period runs out, the indicator light 140 reenters the third state (i.e., turn-off).

Figure 4:
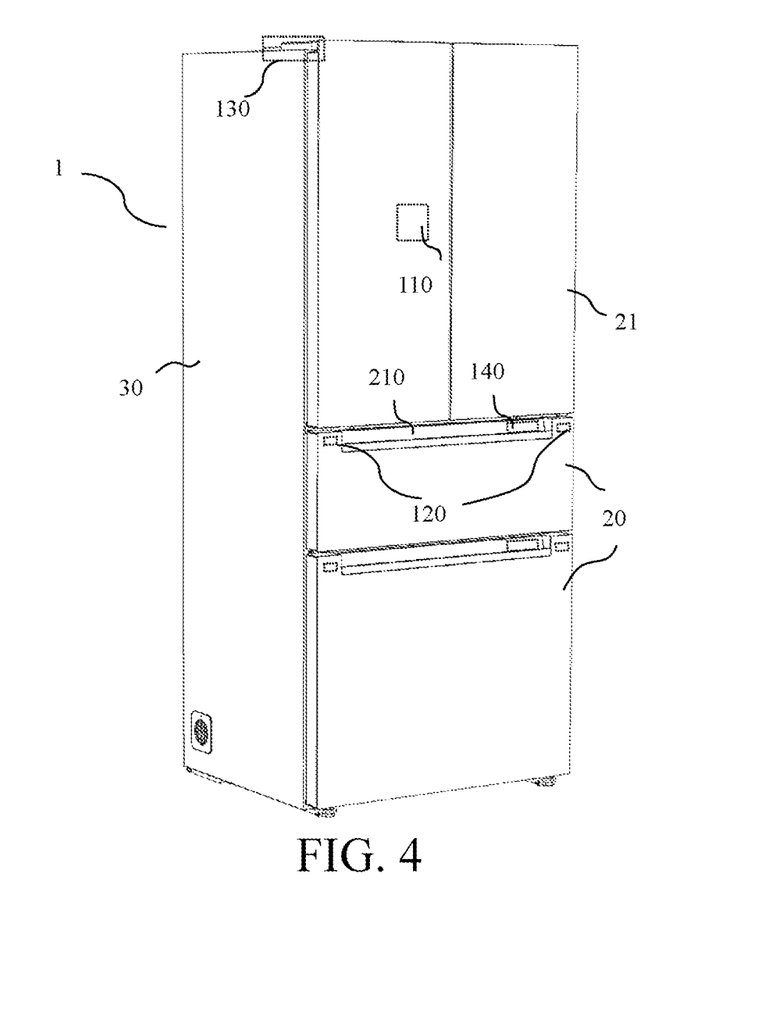
FIG. 4 is a stereoscopic view of a refrigerator according to an exemplary embodiment of the invention.

FIG. 4 is a stereoscopic view of a refrigerator according to an exemplary embodiment of the invention.

As shown in FIG. 4, the refrigerator is a side-by-side refrigerator.

Before detailed description is started, the directional terminologies used in the description is for a conventional use state of the refrigerator and is for ease of description and cannot be understood as an absolute definition of the corresponding features.

It can be seen from FIG. 4 that the refrigerator 1 includes a refrigerator body 30, two side-hung type door bodies 21 mounted on the refrigerator body 30, and two drawer-type door bodies 20. The two side-hung type door bodies 21 are pivotally connected to opposite sides of the refrigerator body 30, so that an operation space therein may be opened or closed in a left-right pivoting manner. The two drawer-type door bodies 20 are disposed side by side below the side-hung type door bodies 21 along a height direction of the refrigerator, and may be pushed back and forth along a depth direction of the refrigerator 1 to open or close a corresponding operation space. Here, the operation spaces defined by the door bodies 20 and 21 and the refrigerator body 30 may be configured as a refrigerating chamber, a freezing chamber, and a variable temperature chamber according to the specific type of the refrigerator. A person skilled in the art will appreciate that the invention is also applicable to other types of refrigerators, such as a separate refrigerating machine or freezer. In addition, according to needs, the invention may also be applied to other household refrigeration appliances other than refrigerators, such as wine cabinets.

Here, the refrigerator 1 further includes the indication device 10 shown in FIG. 1, and the indication device 10 is disposed on the refrigerator body 30 and/or the door bodies 20 and 21. One possible arrangement mode of components of the indication device 10 on the refrigerator 1 is exemplarily illustrated by dashed boxes in FIG. 4. In the exemplary embodiment, the first detection unit 110 is disposed on a front surface of one door body 21 of the refrigerator 1 to detect an object activity situation within a determination range (for example, 2-3 meters) around the refrigerator 1. The second detection unit 120 includes, for example, sensing portions and trigger portions. The sensing portions are, for example, disposed at left and right edges of an opening and closing side of the drawer-type door body 20 of the refrigerator 1, and the trigger portions are, for example, disposed at corresponding positions of the refrigerator body 30 of the refrigerator 1, and vice versa. When the drawer-type door bodies 20 of the refrigerator 1 are closed, the trigger portions of the second detection unit 120 are closely opposite to the associated sensing portions, respectively. The indicator light 140 of the indication device 10 is, for example, disposed in a handle groove structure 210 of the drawer-type door body 20 and exposed from the front surface of the refrigerator 1, so as to be able to be observed by a user standing in front of the refrigerator 1 when the indicator light 140 is turned on. In this example, one indicator light 140 is provided in the handle groove structure 210 of each drawer-type door body 20, respectively. Here, the first detection unit 110, the second detection unit 120, and the indicator lights 140 are all, through wiring harnesses (not shown), connected to the processor 130 disposed at the top of the refrigerator body 30.

Figure 5:
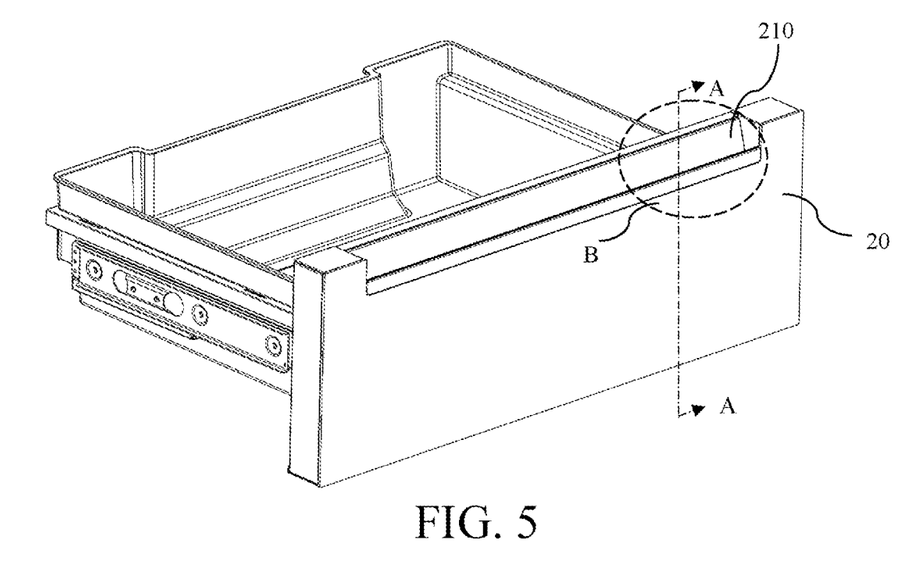
FIG. 5 is a stereoscopic view of a drawer-type door body equipped with an indicator light according to an exemplary embodiment of the invention.

FIG. 5 is a stereoscopic view of a drawer-type door body equipped with an indicator light according to an exemplary embodiment of the invention.

Figure 6:
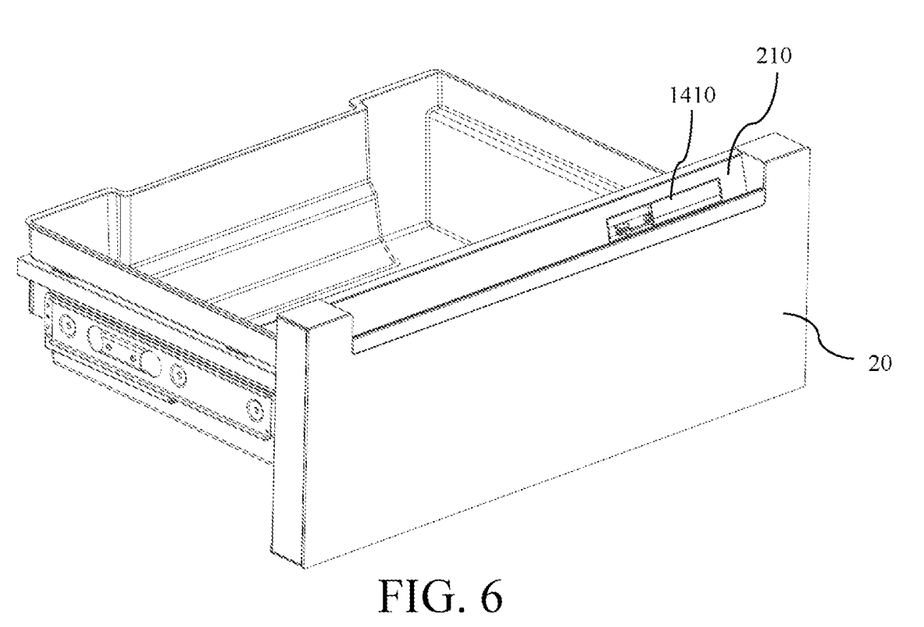
FIG. 6 is a stereoscopic view of the drawer-type door body shown in FIG. 5 having an LED lamp body embedded therein and not yet covered by a lamp cover.

FIG. 6 is a stereoscopic view of the drawer-type door body shown in FIG. 5 having an LED lamp body embedded therein and not yet covered by a lamp cover.

It can be seen from FIG. 5 to FIG. 6 that the drawer-type door body 20 of the refrigerator 1 has an embedded handle groove structure 210 at an edge of an opening and closing side (or a top). In FIG. 5, the indicator light 140 has been disposed in the handle groove structure 210 and disposed to extend along a length direction of the handle groove structure 210. Since the LED lamp body has been covered by the lamp cover of the indicator light 140, the LED lamp body cannot be directly observed from the outside through the lamp cover. The LED lamp body 1410 exposed from the handle groove structure 210 can be seen in FIG. 6.

Figure 7:
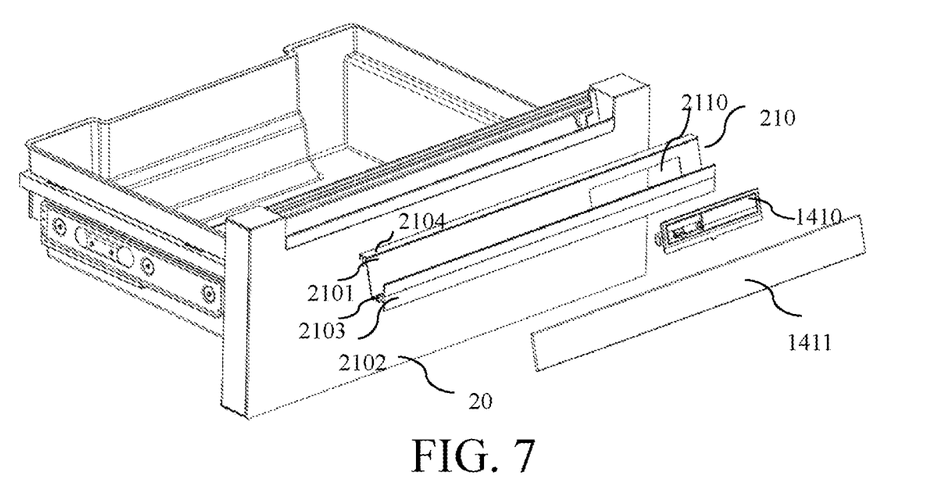
FIG. 7 is an exploded view of a handle of the drawer-type door body shown in FIG. 5.

FIG. 7 is an exploded view of a handle of the drawer-type door body shown in FIG. 5. As shown in FIG. 7, the handle groove structure 210 includes a first side wall 2101, a second side wall 2102 opposite to the first side wall 2101, and a transition portion 2103 connecting the first side wall 2101 and the second side wall 2102. In a case that the drawer-type door body 20 is closed, the first side wall 2101 is, for example, closer to the refrigerator body of the refrigerator than the second side wall 2102. In addition, the handle groove structure 210 further includes an end surface 2104, and the end surface 2104 is connected to the transition portion 2103 through the first side wall 2101 in the form of an inclined surface.

Here, an upper edge of the second side wall 2102 is lower than the first side wall 2101 as viewed from the front surface of the refrigerator 1 toward the operation space, so that the first side wall 2101 is partially exposed from the handle groove structure 210. Also, the first side wall 2101 is provided with an accommodating portion 2110 in the form of an opening on a surface opposite to the second side wall 2102 and is therefore adapted to fit the LED lamp body 1410 to allow the LED lamp body 1410 to be embedded in the first side wall 2101. In the embedded state, an outer surface of the LED lamp body 1410 is flush with, for example, a surface of the first side wall 2101 facing the second side wall 2102. Here, it can also be seen that a housing of the LED lamp body 1410 has a protrusion at a bottom, and the function of the protrusion is pre-positioning the LED lamp body 1410 in the handle groove structure 210 prior to sealing of the lamp cover 1411. In order to make the LED lamp body 1410 and the associated wiring harness not directly exposed from the surface of the first side wall 2101 and be observed by the user, they are covered by the lamp cover 1411. As an example, the lamp cover 1411 is formed in a plate shape and is adapted to a length and a width of the first side wall 2101 of the handle groove structure 210 along a length and width direction.

Figure 8:
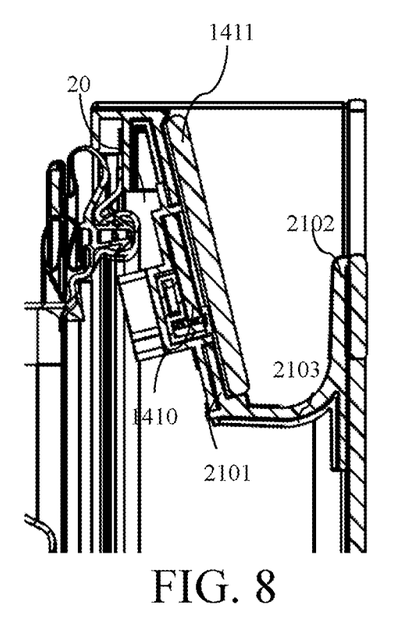
FIG. 8 is a partial cross-sectional view of a portion B of FIG. 5 taken along a section line A-A.

FIG. 8 is a partial cross-sectional view of a portion B of FIG. 5 taken along a section line A-A.

It can be seen that the first side wall 2101 and the second side wall 2102 of the handle groove structure 210 are connected to each other through the transition portion 2103, and the first side wall 2101 and the second side wall 2102 are respectively engaged into corresponding recesses of the remainder of the door body 20 through bottom protruding structures for fixing. In addition, since the LED lamp body 1410 is positioned according to an inclination angle of the first side wall 2101, after the lamp cover 1411 covers the LED lamp body 1410, an external decorative surface of the lamp cover 1411 is also disposed obliquely outward relative to the refrigerator body 30 of the refrigerator 1, thereby catering to the line of sight of the user, and facilitating being observed more easily.

Figure 9:
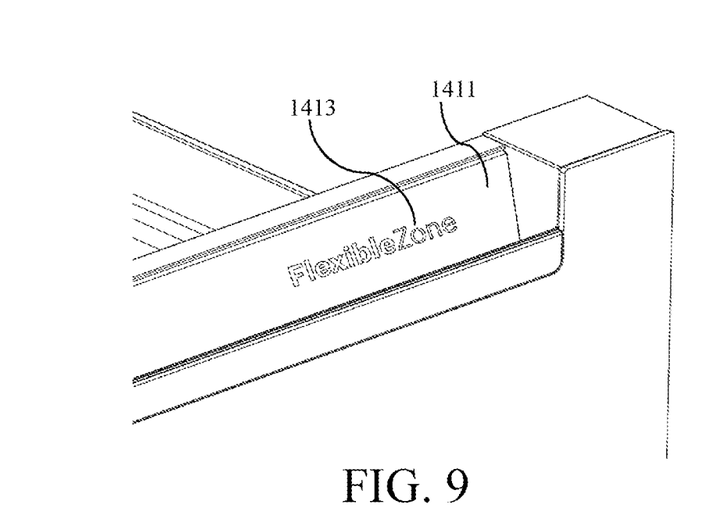

FIG. 9 is a partial enlarged view of the drawer-type door body shown in FIG. 5 when an indicator light indicates in an always-ON state. In the first state, since an indicative identifier 1413 is hollowed, for example indented or cut-out, on a position of the lamp cover 1411 covering the LED lamp body (the indicator identifier is, for example, text or a pattern representing a function of an operation space), when the LED lamp body is turned on, light will be transmitted through a hollow portion to present a text effect.

Although the specific embodiments have been described above, these embodiments are not intended to limit the scope of the invention, even if only a single embodiment is described with respect to a particular feature. Examples of features provided in the invention are intended to be illustrative and not restrictive, unless different statements are made. In particular implementations, multiple features may be combined with each other in a technically feasible case, depending on actual requirements. Various substitutions, alterations, and modifications may also be conceived without departing from the spirit and scope of the invention.

The invention claimed is:

1. An indication device for a refrigerator, the indication device comprising:
   an indicator light;
   a first detection unit configured to detect an object activity situation around the refrigerator;
   a second detection unit configured to detect an open/closed state of at least one door body of the refrigerator; and
   a processor communicatively connected to said first detection unit, said second detection unit and said indicator light, said processor configured to control said indicator light to indicate a first state or a second state according to detection results of said first detection unit and said second detection unit, said first state being different than said second state.

2. The indication device according to claim 1, wherein:
   said indicator light indicates said first state when said first detection unit detects that an object enters a determination range around the refrigerator and said second detection unit detects that all door bodies of the refrigerator are closed; and
   said indicator light indicates said second state when said second detection unit detects that the at least one door body of the refrigerator is open.

3. The indication device according to claim 2, wherein said indicator light indicates said first state when said second detection unit detects that the at least one door body of the refrigerator is changed from an opened state to a closed state until all the door bodies are closed.

4. The indication device according to claim 1, wherein:
   said indicator light is always ON in said first state and dynamically indicates said second state, or
   said indicator light dynamically indicates in said first state and is always ON in said second state.

5. The indication device according to claim 1, wherein:
   said processor includes a timer and a delay trigger circuit;
   said timer is configured to be adapted to record at least one of a first duration when said indicator light indicates said first state or a second duration when said indicator light indicates said second state;
   said delay trigger circuit is configured to control said indicator light to indicate a third state according to at least one of said first duration or said second duration; and
   said third state is different than said first state and said second state.

6. The indication device according to claim 1, which further comprises a switch for controlling enabling and disabling of said first detection unit.

7. The indication device according to claim 1, wherein said first detection unit is configured as a radar sensor, and said radar sensor has a fan-shaped detection range with a radiation radius of 2 m to 3 m.

8. The indication device according to claim 1, wherein said second detection unit includes a magneto-sensitive sensor.

9. A refrigerator, comprising:
   a refrigerator body,
   a door body; and
   said indication device according to claim 1, said indication device being disposed on at least one of said refrigerator body or said door body.

10. The refrigerator according to claim 9, wherein said indicator light of said indication device has an external decorative surface disposed obliquely outward relative to said refrigerator body.

11. The refrigerator according to claim 9, wherein:
    said door body has a handle groove structure at an edge of an opening and closing side; and said indicator light of said indication device is at least one indicator light disposed in said handle groove structure and extending along a length direction of said handle groove structure.

12. The refrigerator according to claim 11, wherein said at least one indicator light includes an LED lamp body and at least a partially light-transmissive lamp cover, said LED lamp body being embedded in said handle groove structure, and said lamp cover covering said LED lamp body.

13. The refrigerator according to claim 12, wherein:
said handle groove structure includes a first side wall, a second side wall opposite to said first side wall, and a transition portion interconnecting said first side wall and said second side wall;
said first side wall being provided with an accommodating portion on a surface opposite to said second side wall, and said accommodating portion being configured to be adapted to fit said LED lamp body to allow said LED lamp body to be embedded in said first side wall of said handle groove structure.

14. The refrigerator according to claim 12, which further comprises an indicative identifier hollowed on a position of said lamp cover covering said LED lamp body.

15. The refrigerator according to claim 14, wherein said indicative identifier includes at least one of text or a pattern representing a function of at least one operation partition of the refrigerator.

* * * * *